United States Patent [19]
Hartmann

[11] 3,962,087
[45] June 8, 1976

[54] IMMERSION FILTER

[76] Inventor: Hans Hartmann, Wiesenweg 175, 8501 Wachendorf, Germany

[22] Filed: June 27, 1974

[21] Appl. No.: 483,808

[30] Foreign Application Priority Data
June 27, 1973  Germany............................ 2332589

[52] U.S. Cl................................. 210/150; 261/92
[51] Int. Cl.$^2$......................................... B01D 33/02
[58] Field of Search ............... 210/150, 151; 261/92

[56] References Cited
UNITED STATES PATENTS

| | | | |
|---|---|---|---|
| 3,301,401 | 1/1967 | Hall.................................. | 210/150 |
| 3,540,589 | 11/1970 | Boris................................. | 210/150 |
| 3,688,905 | 4/1970 | Nordgard.......................... | 210/151 |
| 3,777,891 | 12/1973 | Stengelin ......................... | 210/150 |
| 3,837,492 | 9/1974 | DiBello............................ | 210/150 |
| 3,847,811 | 11/1974 | Stengelin ......................... | 210/150 |

FOREIGN PATENTS OR APPLICATIONS

| | | | |
|---|---|---|---|
| 1,584,940 | 9/1970 | Germany.......................... | 210/150 |

*Primary Examiner*—John Adee
*Attorney, Agent, or Firm*—Craig & Antonelli

[57] ABSTRACT

An immersion percolating filter arrangement for biologically purifying sewage effluent which is provided with growth accumulation surfaces adapted to be slowly rotated about an axis of rotation whereby the surfaces are alternately immersed in the sewage effluent and removed therefrom so as to enrich the biological growth accumulated thereon with oxygen. The growth accumulation surfaces are formed from a flexible material which are suspended under tension in planes parallel to one another within a roller cage support structure having end faces which are substantially circular. The end faces of the roller cage support structure are each provided with a bearing arrangement for permitting the rotation of the support structure about the axis of rotation with one of the bearing arrangements being connected to a suitable driving source. The end faces of the roller cage support structure are provided with radial support arms with the free ends of the arms being connected by a rigid connection member extending parallel to the axis of rotation for supporting the flexible material.

52 Claims, 6 Drawing Figures

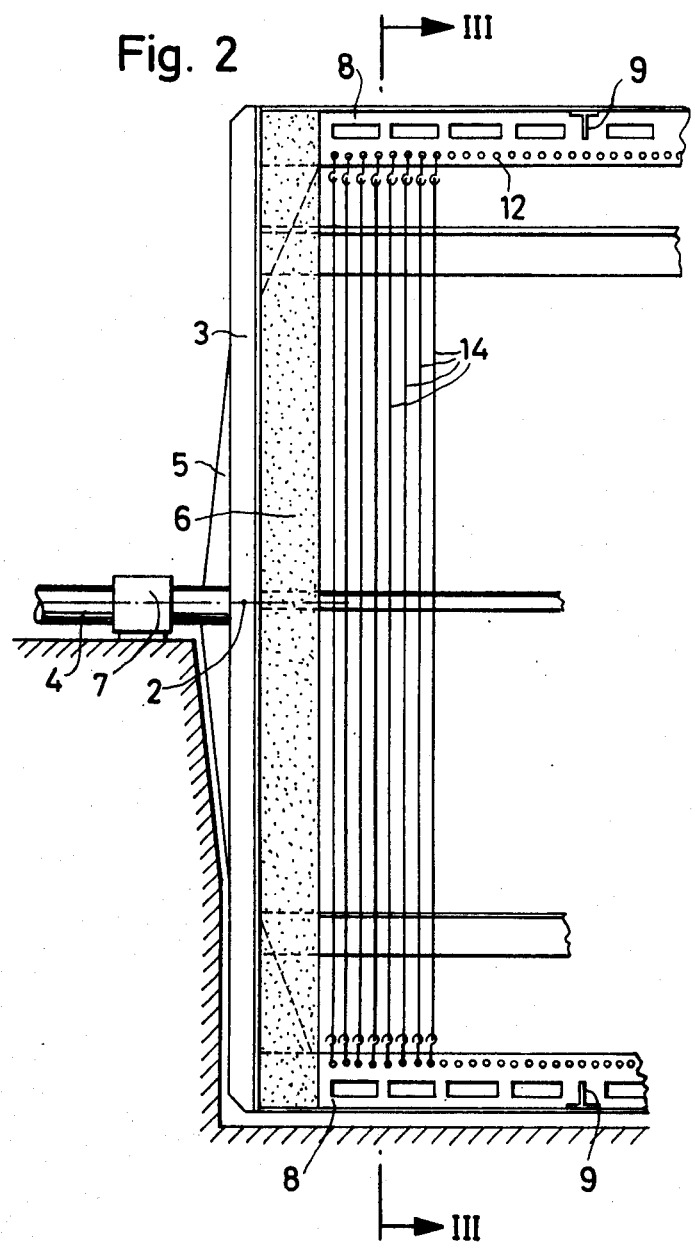

IMMERSION FILTER

The present invention relates to filters, especially immersion percolating filters for biologically purifying sewage effluent having growth accumulation surfaces formed from a flexible material and suspended under tension in planes parallel to one another within a cage support structure.

Immersion filters are known, having growth surfaces preferably made of plastic material, which are slowly rotated about a pivotal axis substantially abutting the water surface. The growth surfaces alternately immerse in the sewage effluent and then, in order to enrich the biological growth formed thereon with oxygen, emerge from the effluent.

The conventional immersion percolating filters of this type have a rotatable shaft on which discs which are as thin as possible are mounted and spaced apart from one another with the discs preferably being made of polystyrene. The thinner the discs, the more discs that can be accommodated on the shaft of a predetermined length and, accordingly, the greater the number of discs the greater the growth surface area. However, the thickness of the discs is limited by the fact that the discs must be sufficiently resistant to bending and distortion to insure that opposing growth surfaces do not come into abutment with one another thereby reducing the growth surface area.

If a reasonable thickness of disc made from polystyrene is employed, then, if the diameter of the discs is greater than one 1m, it is necessary to insert spacers between the individual discs to obtain the necessary rigidity or to increase their inherent rigidity by their spatial deformation. Such discs then must be interconnected in a stud-like manner or cemented together at their points of contact. In this manner, disc assemblies of rigid, compact structure may be assembled together to form disc rollers which have a diameter of more than 3m. However, the shaft used to support such a disc assembly has to bear a considerable weight and, therefore, may even need to be substantially of the same diameter as the disc assembly. A shaft of such size, particularly, because its pivotal axis must be located at a suitable distance above the sewage effluent, reduces the area available for growing a biological growth. Additionally, due to the bending moments to be absorbed by the shaft, the sewage tank cannot have an excessive width.

A further disadvantage of known disc immersion percolating filters resides in the fact that the discs, because of the spacers disposed therebetween or due to the shaping with spacing cams, do not permit a smooth movement of the discs through the sewage effluent and, consequently, the flow resistance and the force required for rotating the discs is increased. Even at conventional speeds, to overcome the flow resistance caused by turbulence at the spacing members, a substantial proportion of the power requirement of the sewage clarifying plant is required. Hence, if the nature of the sewage composition is such that a high speed of rotation is expedient, the power requirement rapidly rises to beyond an economically acceptable limit.

Moreover, in prior art immersion percolating filters, the spacers and points of contact of the growth surfaces which are necessary because of the particular shaping of the discs, are deposit points for undesired clogging with sludge. The sludge growth formed at these points easily becomes felted and cannot readily be rinsed off.

A further disadvantage of known percolating filters resides in the fact that the immersion tank must correspond closely to the external profile of the disc assembly in order to prevent sludge being deposited between the disc rollers and the inner surface of the filter tank. This latter arrangement requires the tarrying time of the sewage in the tank to be limited. Accordingly, it is necessary to use further rollers in a further filter tank. Hence, in plants where sewage which has already been extensively clarified is to be treated, the prime requirement is a longer tarrying time rather than increasing the growth area. However, for the reasons stated hereinabove, the additional growth has had to be used.

Finally, known immersion filters do not have a long life since such life depends upon the quality of corrosion protection and the possibility of repeatedly renewing the corrosion protection. For this purpose it is necessary, however, for the immersion disc filter member comprising a shaft, discs, shaping plates, tubes, spacers, screw connections and the like to be completely dismantled thereby resulting in a considerable expenditure to maintain such prior art immersion filters.

Accordingly, it is an object of the present invention to provide an immersion percolating filter arrangement which avoids the shortcomings and drawbacks encountered in the prior art.

It is a further object of the present invention to provide a simpler and less expensive immersion filter which may be smaller and hence more efficiently use available space.

According to one feature of the present invention, there is provided an immersion filter member for biologically purifying sewage effluent which has growth accumulation surfaces which are adapted to be slowly rotated about an axis of rotation whereby the surfaces are alternately immersed in the sewage effluent and removed therefrom so as to enrich the biological growth accumulated thereon with oxygen. The growth accumulation surfaces according to the present invention are formed from a flexible material which are suspended under tension in planes parallel to one another within a roller cage support structure rotatable about the axis of rotation with the end faces of the support structure being substantially circular.

According to the present invention, the growth accumulation surfaces are preferably in the form of plastic material foils.

According to a further feature of the present invention, the end faces of the roller cage support structure are each provided with bearing means permitting the rotation of the support structure about an axis of rotation with one of the bearing means being connectable to a suitable drive means. The drive means is, in most cases, an electric motor or the like which may be controllable by suitable conventional means so that the immersion filter members can be rotated at any desired speed.

According to yet another feature of the present invention, the end faces of the roller cage support structure are each provided with at least three radial support arms extending from the axis of rotation. The arms are of substantially U-shaped or substantially T-shaped in cross-section with the free ends of the arms being connected by rigid connection support members extending parallel to the axis of rotation which support members support the plastic material foils. The foils having as many sides as there are connection supports and being suspended under tension one behind the other. Consequently, with three connection supports, the form of the foils would conventionally be that of an equilateral triangle, with four supports a square and with five supports a regular pentagon and so on.

In a further embodiment, the end faces of the support structure are each provided with a circular support disc provided on its outer surface with bracing ribs. The periphery of the bracing ribs are interconnected by rigid connection supports which extend parallel to the axis of rotation with the plastic material foils being supported on the supports. The foils are suspended under tension one behind the other and have as many sides as there are connection supports.

Furthermore, according to the present invention, the connection supports have a round or tubular profile with the angle portions of the foils being mounted thereon under tension by means of resiliently yielding intermediate members.

Additionally, according to a further feature of the present invention, the connection supports are interconnected by connection members extending transversely to the rotational axis. According to another feature of the present invention, a support structure means is provided such that the inner space of the roller cage support structure is completely unencumbered and may be used in is entirety to house a sealed arrangement of the foils or fabrics forming the growth surfaces. The foils or fabrics of the present invention have a low flow resistance and additionally have no corners or projections for the deposite of sludge or for the formation of turbulence.

According to a still further feature of the present invention, the connection supports extending parallel to the rotational axis are interconnected by a lattice frame structure.

An advantage of the present invention resides in the fact that the drive means are adapted to rotate the roller cage support structure in a direction such that the growth surfaces immersed in the sewage effluent are moved in or against the direction of flow of the sewage.

A further advantage of the present invention resides in the fact that the flexible material surfaces consist of a monofilament fabric or perforated discs and the sewage effluent traverses a filter tank in a direction substantially at right angles to the plane of the growth accumulation surfaces.

A still further advantage of the present invention resides in the fact that an immersion filter arrangement is provided having no spacers or points of contact of the growth surfaces in the interior of the roller cage. The growth surfaces are smooth and tensioned and consequently during rotation of the discs present a minimal flow resistance to the sewage effluent.

A further advantage of the present invention resides in the fact that since there are no points of contact of the growth surfaces, no pockets of sludge can form. Furthermore, if the growth surfaces become slack, they can easily be re-tensioned. Any sludge accumulations which may possible occur in the angles of the cage structure are located on the external surface of the roller and are, therefore, easy to wash off.

Yet another advantage of the present invention resides in the fact that no through support shaft is required in the filter of the present invention. The bending moment caused by the deadweight of the roller is transmitted through a support plate as a tensional or pressure force to the edge of the roller. Due to the considerable opposing moment of the roller, these pressures and tensional forces from the bending moment are readily absorbed.

Furthermore, according to the present invention, the shape of the immersion tank need not correspond exactly to the circumference of the cage. This is particularly true if the roller diameter is large, which, in the present invention, is particularly advantageous, since the greater the speed of rotation, the greater the peripheral speed. Additionally, the spacing between the cage wall and the bottom of the immersion tank can therefore be predetermined to permit a variation of the tarrying time of the sewage within the tank within wide limits. Moreover, since the spacing of the growth surfaces from one another may be easily changed, the overall growth accumulation surface area formed by the foils of the present invention and the tarrying time of the sewage in the tank may be suitably selected independently of one another.

A still further advantage of the present invention resides in the fact that the entire immersion filter may be assembled easily from sheets and section profiles which may even be made of wood. The growth accumulation surfaces may be cut from webs, in the case of narrow webs, several webs may be sown together side-by-side or may be cemented or welded together.

These and other objects, features, and advantages of the present invention will become more obvious from the following description when taken in connection with the accompanying drawing which shows, for the purposes of illustration only, several embodiments of an immersion percolating filter arrangement in accordance with the present invention, and wherein:

FIG. 2 is a view taken along line II—II of FIG. 1 and illustrates the tensioned foils suspended therein, which foils form the growth surfaces of the filter in accordance with the present invention;

Figure 1:
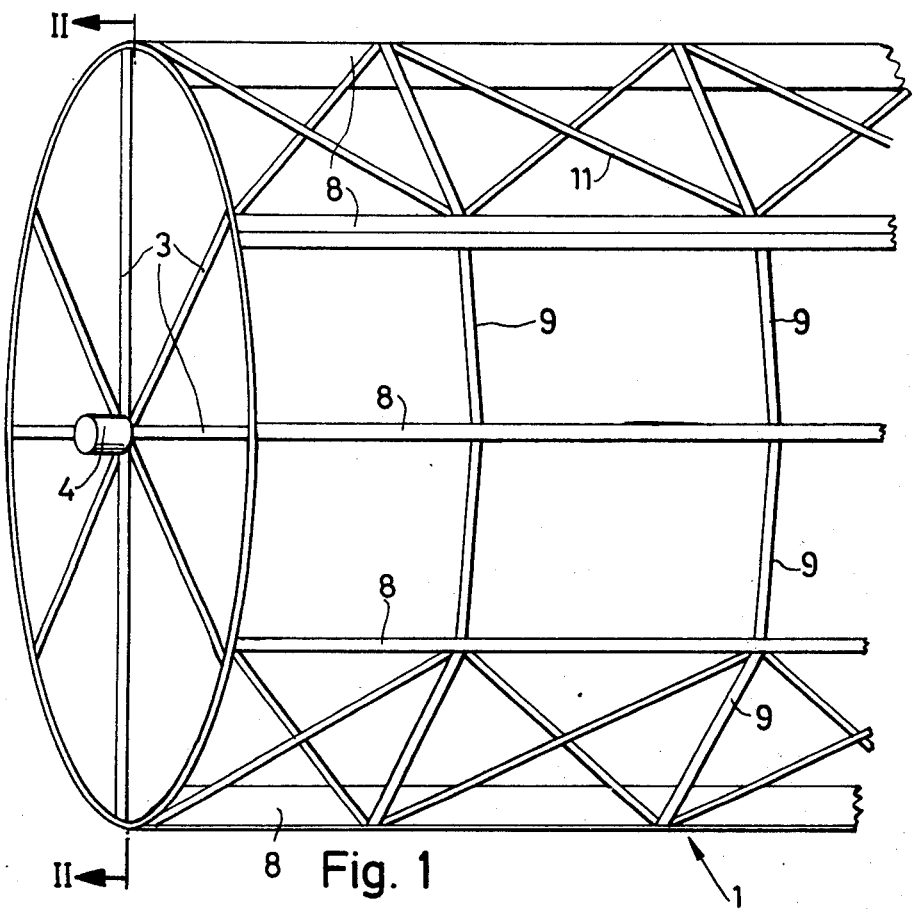
FIG. 1 is a perspective view of a portion of a roller cage support structure forming a portion of the filter of the present invention.

Referring now to the drawing wherein like reference numerals are used throughout the various views to designate like parts and more particularly to FIG. 1 which shows a roller cage support structure 1, each end of which comprises a plurality of support arms 3 extending radially from an axis of rotation 2. Coaxially with the axis of rotation, an axle journal is fixed, for example, by welding, onto the arms 3, which is supported by a plurality of support plates 5 in its position provided.

The internal surfaces of the support arms 3 forming the end faces of the roller cage support structure, only one of which is shown in FIG. 2, are each covered by a polystyrene filling 6 on the external surfaces of these arms an axle journal 4 is provided, each of which are mounted in a bearing 7. One of the axle journals is connected to a prime mover such as an electric motor (not shown) through a suitable coupling (not shown) and, if desired, a gearing, and is slowly rotated thereby.

The free ends of the support arms 3 forming the end faces of the roller cage support structure 1 are interconnected by rigid connecting supports 8 extending parallel to the axis 2 which, as shown in FIG. 2, are in the form of angle profiles. The longitudinal supports 8 are, in turn, interconnected by connecting members 9 which prevent the supports 8 from buckling. The supports 8 and the members 9 are further interconnected and supported by a lattice structure 11 (FIG. 1) which prevents the roller cage support structure 1 from twisting or distorting when it is driven from one end face only.

Figure 3:
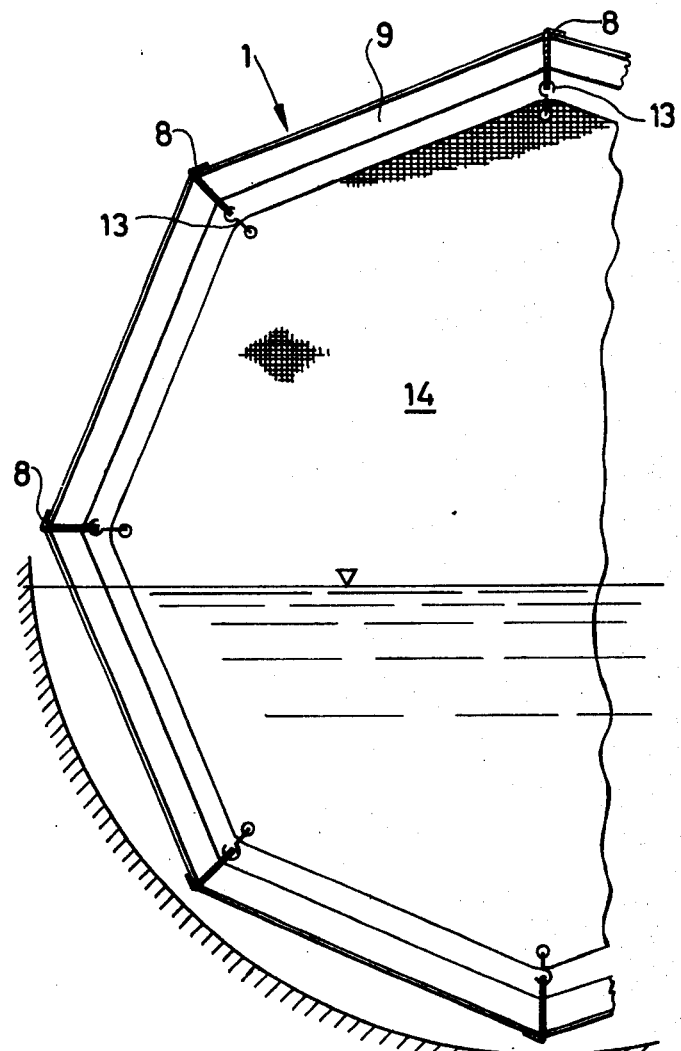
FIG. 3 is a view taken along line III—III of FIG. 2.

As shown in FIGS. 2 and 3, in the inwardly directed shanks of the angle profile connecting supports 8, apertures 12 are formed, in which resiliently yielding intermediate members 13 are suspended. The members 13 support foils 14 which are arranged parallel to one another and simultaneously tension them. These foils which can alternatively be plates, mesh or fabrics, form the growth surfaces of the immersion filter member and are traversed by the sewage in the direction transverse to the axial direction or, by suitably providing the foils with perforations, in the axial direction as well.

Figure 5:
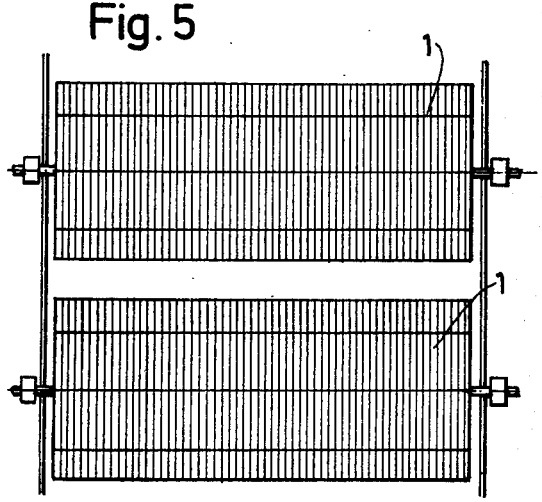
FIG. 5 is a plan view of two immersion filters in accordance with the present invention.
Figure 4:
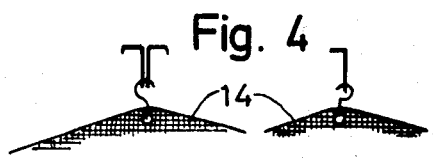
FIG. 4 is a schematic illustration of the suspension members for the surfaces of the filter in accordance with the present invention.
Figure 6:
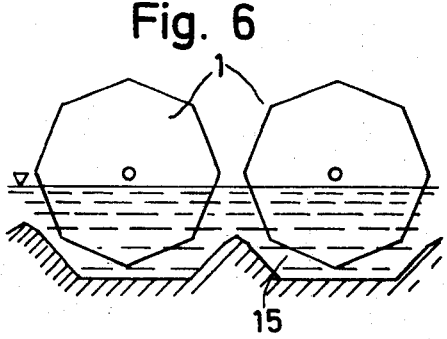
FIG. 6 is an end elevational view of two immersion filters in accordance with the present invention with the filter immersed in an immersion tank.

As shown in FIGS. 5 and 6 two roller cage support structures 1 may be provided each having suspended foils with the respective axes of each of the roller cage support structures extending parallel to one another with both of said structures being located in an immersion tank 15. This tank, may, if desired, be provided with a weir.

While I have shown and described several embodiments in accordance with the present invention, it is understood that the same is not limited thereto but is susceptible to numerous changes and modifications as known to a person skilled in the art, and I therefore do not wish to be limited to the details shown and discribed herein but intend to cover all such changes and modifications as are encompassed by the scope of the appended claims.

I claim:

1. An immersion filter arrangement for biologically purifying sewage effluent, the arrangement comprising: a roller cage support structure means for rotation about an axis thereof, a plurality of biological growth accumulation surface means, and suspension means for suspending said growth accumulation surface means within said roller cage support structure means under tension in planes extending substantially parallel to one another, said biological growth accumulation surface means being adapted to be slowly rotated whereby said growth accumulation surface means are alternatively immersed in the sewage effluent and removed therefrom to enrich the biological growth accumulated thereon with oxygen, said biological growth accumulation surface means comprising foils or webs crossing said axis and being suppported by said suspension means at the peripheries of said foils or webs only.

2. An arrangement according to claim 1, wherein said growth accumulation surface means are formed from sheets of flexible material.

3. An arrangement according to claim 2, wherein said roller cage support structure means is provided with end faces, said end faces being substantially circular in cross section.

4. An arrangement according to claim 3, wherein said flexible material is a plastic material, and wherein said growth accumulation surface means are constructed as foils.

5. An arrangement according to claim 4, wherein said means for rotatably supporting said roller cage support structure means includes bearing means provided at each of said end faces of said roller cage support structure means for permitting rotation thereof, and wherein a drive means is provided operatively connected with one of said bearing means for driving said roller cage support structure means.

6. An arrangement according to claim 3, wherein a plurality of support arms are provided at each end face of said roller cage support structure means extending radially from the axis of rotation thereof, and wherein a plurality of rigid support means are provided between said end faces and extend substantially parallel to the axis of rotation of said roller cage support structure means, said growth accumulation surface means being mounted in tension between said rigid support means one behind the other by said suspension means.

7. An arrangement according to claim 6, wherein said radially extending support arms are substantially U-shaped in cross section.

8. An arrangement according to claim 6, wherein said radially extending support arms are substantially T-shaped in cross section.

9. An arrangement according to claim 6, wherein said growth accumulation surface means includes a plurality of side edges, adjacent side edges of said growth accumulation surface means forming an angle portion, and wherein said suspension means includes a yielding member disposed at a respective angle portion.

10. An arrangement according to claim 6, wherein said rigid support means have a substantially round or tubular cross section.

11. An arrangement according to claim 6, wherein means are provided for interconnecting said plurality of rigid support means, said last-mentioned means extending transversely to the axis of rotation of said roller cage support structure means.

12. An arrangement according to claim 6, wherein means are provided for interconnecting said plurality of rigid support means, said last-mentioned means including a lattice frame structure disposed between said rigid support means.

13. An arrangement according to claim 6, wherein said flexible material consists of a mono-filament fabric, and wherein a filter tank is provided, the sewage effluent traversing said filter tank in a direction substantially at right angles to the plane of said growth accumulation surface means.

14. An arrangement according to claim 6, wherein said flexible material consists of a perforated disc, and wherein a filter tank is provided, the sewage effluent traversing said filter tank in a direction substantially at right angles to the plane of said growth accumulation surface means.

15. An arrangement according to claim 3, wherein at least three support arms are provided at each end face of said roller cage support structure means extending radially from the axis of rotation thereof and wherein a plurality of rigid support means are provided between said end faces and extend substantially parallel to the axis of rotation of said roller cage support structure means, said growth accumulation surface means being provided with a plurality of side edges at least equal in number to the plurality of said rigid connection support means, said growth accumulation surface means being mounted in tension one behind the other between said rigid support means.

16. An arrangement according to claim 15, wherein adjacent side edges of said growth accumulation surface means form an angle portion, and wherein said suspension means includes a yielding member disposed at a respective angle portion.

17. An arrangement according to claim 15, wherein said rigid support means have a substantially round or tubular cross section.

18. An arrangement according to claim 15, wherein means are provided for interconnecting said plurality of rigid support means, said last-mentioned means extending transversely to the axis of rotation of said roller cage support structure means.

19. An arrangement according to claim 15, wherein means are provided for interconnecting said plurality of rigid support means, said last-mentioned means including a lattice frame structure disposed between said rigid support means.

20. An arrangement according to claim 15, wherein said flexible material consists of a mono-filament fabric, and wherein a filter tank is provided, the sewage effluent traversing said filter tank in a direction substantially at right angles to the plane of said growth accumulation sufface means.

21. An arrangement according to claim 15, wherein said flexible material consists of a perforated disc, and wherein a filter tank is provided, the sewage effluent traversing said filter tank in a direction substantially at right angles to the plane of said growth accumulation surface means.

22. An arrangement according to claim 3, wherein a circular support disc means is provided at each of said end faces of said roller cage support structure means, a plurality of rigid support means are provided at the peripheries of said circular support disc means and extend therebetween substantially parallel to the axis of rotation of said roller cage support structure means, said growth accumulation surface means being provided with side edges at least equal in number to said plurality of rigid support means and being mounted in tension one behind the other between said rigid support means.

23. An arrangement according to claim 22, wherein adjacent side edges of said growth accumulation surface means form an angle portion, and wherein said suspension means includes a yielding member disposed at a respective angle portion.

24. An arrangement according to claim 22, wherein said rigid support means have a substantially round or tubular cross section.

25. An arrangement according to claim 22, wherein means are provided for interconnecting said plurality of rigid support means, said last-mentioned means extending transversely to the axis of rotation of said roller cage support structure means.

26. An arrangement according to claim 22, wherein means are provided for interconnecting said plurality of rigid support means, said last-mentioned means including a lattice frame structure disposed between said rigid support means.

27. An arrangement according to claim 22, wherein said drive means includes means for rotating said roller cage support structure means in a direction such that the growth accumulation surface means immersed in the sewage effluent are moved in or against the flow of the sewage.

28. An arrangement according to claim 22, wherein said flexible material consists of a mono-filament fabric, and wherein a filter tank is provided, the sewage effluent traversing said filter tank in a direction substantially at right angles to the plane of said growth accumulation surface means.

29. An arrangement according to claim 22, wherein said flexible material consists of a perforated disc, and wherein a filter tank is provided, the sewage effluent traversing said filter tank in a direction substantially at right angles to the plane of said growth accumulation sufface means.

30. An arrangement according to claim 1, wherein said growth accumulation surface means are disposed within said roller cage support structure means in planes extending substantially transverse to the axis of rotation of said roller cage support structure means.

31. An immersion filter arrangement for biologically purifying sewage effluent, the arrangement comprising: a roller cage support structure means having an axis of rotation, means for rotatably mounting said support structure means for rotation about said axis, a plurality of biological growth accumulation surface means comprising foils or webs crossing said axis, and suspension means for suspending said growth accumulation surface means within said roller cage support structure means under tension in planes extending substantially parallel to one another, said biological growth accumulation surface means being suspended in said roller cage support structure means by the peripheries of said biological growth accumulation surface means only.

32. An arrangement according to claim 31, wherein said growth accumulation surface means are formed from sheets of flexible material.

33. An arrangement according to claim 31, wherein said roller cage support structure includes a plurality of support means at each axial end thereof, said support means extending radially from said axis, and a plurality of rigid support members provided between said axial ends extending substantially parallel to said axis, said growth accumulation surface means being mounted in tension between said rigid support members one behind the other by said suspension means.

34. An arrangement according to claim 33, wherein said biological growth accumulation surface means comprises a continuous sheet of flexible material.

35. An arrangement according to claim 31, wherein said biological growth accumulation surface means comprises a continuous sheet of flexible material.

36. An immersion filter arrangement for biologically purifying sewage effluent, the arrangement comprising: a biological growth accumulation surface means, roller cage support structure means having a rotational axis and arranged outside the periphery of and supporting said biological growth accumulation surface means, and means for rotatably mounting said roller cage support structure means for rotation about said axis, said biological growth accumulating surface means comprising at least one sheet of material extending transversely to and intersecting said axis, said biological growth accumulation surface means being supported in said roller cage support structure means by said roller cage support structure means only.

37. An arrangement according to claim 36, wherein said roller cage support structure means includes suspension means for suspending said growth accumulation surface means within said roller cage support structure means under tension.

38. An arrangement according to claim 37, wherein said roller cage support structure means includes a plurality of rigidly mounted support elements arranged parallel to one another and to said axis.

39. An arrangement according to claim 38, wherein said plurality of said parallel support means are arranged on the corners of a regular polygon.

40. An arrangement according to claim 38, wherein said plurality of parallel support means are arranged on the circumference of a circle.

41. An arrangement according to claim 36, wherein said roller cage support structure means includes a plurality of rigidly mounted support elements arranged parallel to one another and to said axis.

42. An arrangement according to claim 41, wherein said plurality of said parallel support means are arranged on the corners of a regular polygon.

43. An arrangement according to claim 41, wherein said plurality of parallel support means are arranged on the circumference of a circle.

44. An arrangement according to claim 41, wherein said at least one sheet of material is continuous.

45. An arrangement according to claim 36, wherein said at least one sheet of material is continuous.

46. In an immersion filter arrangement for biologically purifying sewage effluent including at least one sheet-like member and support means for supporting said at least one sheet-like member for rotation about an axis of said at least one sheet-like member extending transversely to the plane of said at least one sheet-like member whereby portions of said at least one sheet-like member are alternately immersed in sewage effluent and removed therefrom to enrich the biological growth accumulated thereon with oxygen, the improvement wherein said at least one sheet-like member is continuous, wherein said support means supports said at least one sheet-like member from the periphiers thereof only and wherein said sheet-like member is not penetrated by a support shaft coaxial with said axis.

47. An arrangement according to claim 46, wherein said support means comprises a roller cage support structure including a plurality of parallel elongated support members arranged about the periphery of said at least one sheet-like member, said at least one sheet-like member being supported by said plurality of elongated support members.

48. An arrangement according to claim 47, wherein said at least one sheet-like member is supported under tension by said plurality of parallel support members.

49. An arrangement according to claim 48, wherein said plurality of parallel support members are arranged on the corners of a regular polygon.

50. An arrangement according to claim 48, wherein said plurality of parallel support members are arranged on the circumference of a circle.

51. An arrangement according to claim 47, wherein said plurality of support members are arranged on the corners of a regular polygon.

52. An arrangement according to claim 47, wherein said plurality of parallel support members are arranged on the circumference of a circle.

* * * * *